United States Patent
Huang et al.

(10) Patent No.: US 11,211,684 B2
(45) Date of Patent: Dec. 28, 2021

(54) SMALL CELL ANTENNA AND CABLE MOUNTING GUIDES FOR SAME

(71) Applicant: CommScope Technologies LLC, Hickory, NC (US)

(72) Inventors: Joy Huang, Plano, TX (US); Calvin Dickerson, Garland, TX (US); Michael F. Bonczyk, Anna, TX (US); Gangyi Deng, Allen, TX (US); Peter J. Bisiules, LaGrange Park, IL (US); Xiangyang Ai, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/770,119

(22) PCT Filed: Nov. 14, 2018

(86) PCT No.: PCT/US2018/060993
§ 371 (c)(1),
(2) Date: Jun. 5, 2020

(87) PCT Pub. No.: WO2019/118119
PCT Pub. Date: Jun. 20, 2019

(65) Prior Publication Data
US 2020/0350655 A1 Nov. 5, 2020

Related U.S. Application Data

(60) Provisional application No. 62/597,707, filed on Dec. 12, 2017.

(51) Int. Cl.
*H01Q 3/34* (2006.01)
*H01Q 1/12* (2006.01)
(Continued)

(52) U.S. Cl.
CPC .......... *H01Q 1/1228* (2013.01); *H01Q 1/246* (2013.01); *H01Q 15/14* (2013.01)

(58) Field of Classification Search
CPC ....... H01Q 1/1228; H01Q 1/246; H01Q 15/14
(Continued)

(56) References Cited

U.S. PATENT DOCUMENTS

| 2009/0021437 A1* | 1/2009 | Foo ........................ H01Q 1/246 343/761 |
| 2010/0134374 A1 | 6/2010 | Skalina et al. |

(Continued)

OTHER PUBLICATIONS

International Search Report and Written Opinion corresponding to International Application No. PCT/US2018/060993 dated Mar. 6, 2019.

(Continued)

*Primary Examiner* — Peguy Jean Pierre
(74) *Attorney, Agent, or Firm* — Myers Bigel, P.A.

(57) ABSTRACT

A communications antenna includes: an elongate reflector comprising a plurality of panels that define a regular polygonal profile, the reflector having a longitudinal axis; a plurality of circuit boards, each of the circuit boards mounted to a respective reflector panel; a plurality of subsets of radiating elements, each subset of radiating elements mounted in a column on a front surface of a respective circuit board; and a plurality of phase cables, each of the phase cables being mounted to two circuit boards disposed on diametrically opposed reflector panels, the phase cables being positioned forwardly of the circuit boards.

18 Claims, 4 Drawing Sheets

(51) Int. Cl.
  *H01Q 1/24* (2006.01)
  *H01Q 15/14* (2006.01)
(58) Field of Classification Search
  USPC .......................................................... 343/879
  See application file for complete search history.

(56) References Cited

U.S. PATENT DOCUMENTS

| | | | |
|---|---|---|---|
| 2013/0099599 A1* | 4/2013 | Jaffe | ...................... H02J 3/381 |
| | | | 307/151 |
| 2015/0263435 A1 | 9/2015 | Song et al. | |
| 2016/0099505 A1 | 4/2016 | Junttila et al. | |
| 2016/0202440 A1 | 7/2016 | Vaccaro | |
| 2017/0324171 A1 | 11/2017 | Shehan | |
| 2018/0342813 A1* | 11/2018 | Li | ............................ H01Q 3/34 |
| 2020/0119537 A1* | 4/2020 | Heath | ...................... H02G 7/20 |

OTHER PUBLICATIONS

International Preliminary Report on Patentability corresponding to International Application No. PCT/US2018/060993 dated Jun. 25, 2020.

\* cited by examiner

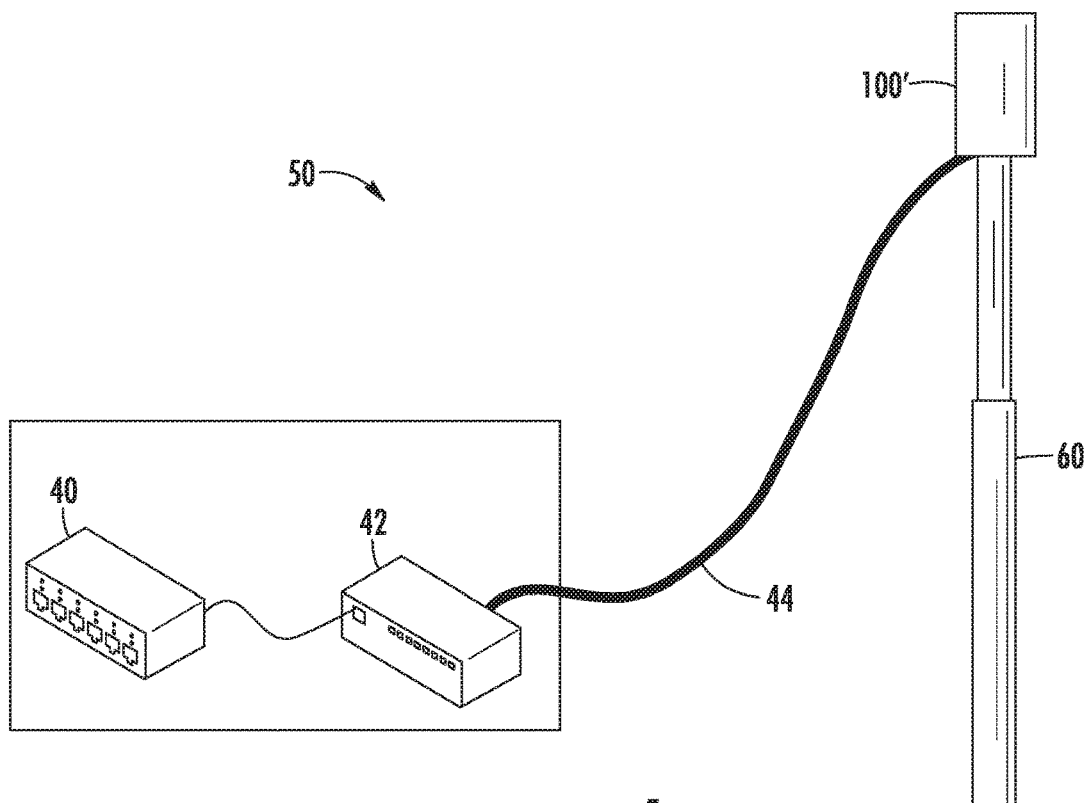
FIG. 1
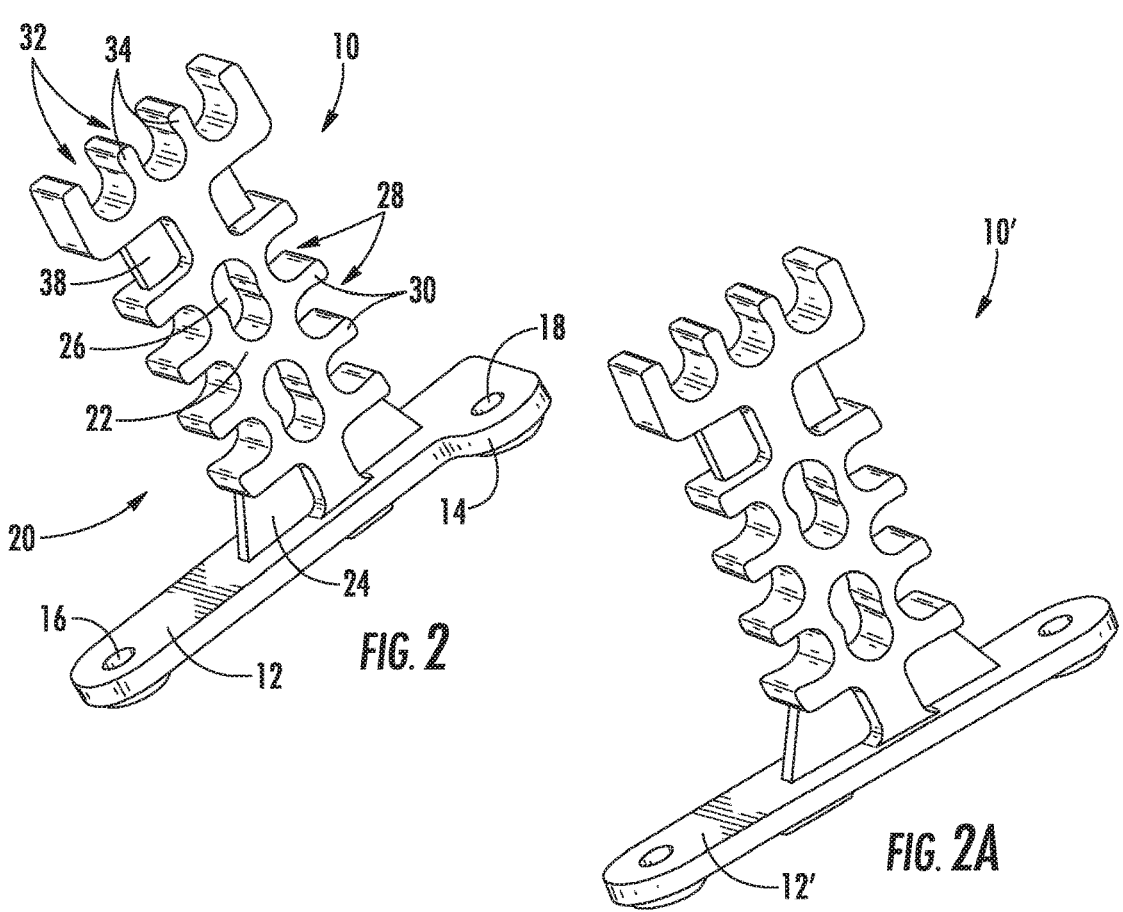
FIG. 2
FIG. 2A

US 11,211,684 B2

SMALL CELL ANTENNA AND CABLE MOUNTING GUIDES FOR SAME

RELATED APPLICATIONS

The present application is a 35 U.S.C. § 371 national phase application of and claims priority to PCT Application PCT/US2018/060993 filed Nov. 14, 2018, which claims the benefit of and priority from U.S. Provisional Patent Application No. 62/597,707, filed Dec. 12, 2017, the disclosure of each of which is hereby incorporated herein by reference in its entirety.

FIELD OF THE INVENTION

The present invention is directed generally to radio frequency (RF) antennas, and more particularly to cabling for RF antennas.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and antennas that are configured to provide two-way RF communications with fixed and mobile subscribers ("users") that are positioned throughout the cell. In many cases, the cell may be divided into a plurality of "sectors," and separate antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have, in recent years, been deploying so-called "small cell" cellular base stations. A small cell base station refers to a low-power base station that may operate in the licensed and/or unlicensed frequency spectrum that has a much smaller range than a typical "macro cell" base station. A small cell base station may be designed to serve users who are within a small geographic region (e.g., tens or hundreds of meters of the small cell base station). Small cells may be used, for example, to provide cellular coverage to high traffic areas within a macro cell, which allows the macro cell base station to offload much or all of the traffic in the vicinity of the small cell base station. Small cells may be particularly effective in Long Term Evolution ("LTE") cellular networks in efficiently using the available frequency spectrum to maximize network capacity at a reasonable cost. Small cell base stations typically employ an antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macro cell.

FIG. 1 is a schematic diagram of a conventional small cell base station 50. As shown in FIG. 1, the base station 50 includes an antenna 100' that may be mounted on a raised structure 60. In the depicted embodiment, the structure 60 is a small antenna tower, but it will be appreciated that a wide variety of mounting locations may be used including, for example, utility poles, buildings, water towers and the like. The antenna 100' may be designed to have an omnidirectional antenna pattern in the azimuth plane for at least some of the frequency bands served by the base station antenna, meaning that at least one antenna beam generated by the antenna 20 may extend through a full 360 degree circle in the azimuth plane.

As is further shown in FIG. 1, the small cell base station 50 also includes base station equipment such as baseband units 40 and radios 42. A single baseband unit 40 and a single radio 42 are shown in FIG. 1 to simplify the drawing, but it will be appreciated that more than one baseband unit 40 and/or radio 42 may be provided. Additionally, while the radio 42 is shown as being co-located with the baseband equipment 40 at the bottom of the antenna tower 60, it will be appreciated that in other cases the radio 42 may be a remote radio head that is mounted on the antenna tower 60 adjacent the antenna 100'. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 100' for transmission via a cabling connection 44. It will also be appreciated that the base station 50 of FIG. 1 will typically include various other equipment (not shown) such as, for example, a power supply, back-up batteries, a power bus, Antenna Interface Signal Group ("AISG") controllers and the like.

SUMMARY

As a first aspect, embodiments of the invention are directed to a communications antenna comprising: an elongate reflector comprising a plurality of panels that define a regular polygonal profile, the reflector having a longitudinal axis; a plurality of circuit boards, each of the circuit boards mounted to a respective reflector panel; a plurality of subsets of radiating elements, each subset of radiating elements mounted in a column on a front surface of a respective circuit board; and a plurality of phase cables, each of the phase cables being mounted to two circuit boards disposed on diametrically opposed reflector panels, the phase cables being positioned forwardly of the circuit boards.

As a second aspect, embodiments of the invention are directed to a cable mounting guide comprising a base panel and a main body extending normal to the base panel. The main body has a top edge and opposed side edges. Each of the top edge and the side edges includes a plurality of recesses. The cable mounting guide is formed of a polymeric material.

As a third aspect, embodiments of the invention are directed to a communications antenna comprising: an elongate reflector comprising a plurality of panels that define a regular polygonal profile, the reflector having a longitudinal axis; a plurality of circuit boards, each of the circuit boards mounted to a respective reflector panel; a plurality of subsets of radiating elements, each subset of radiating elements mounted in a column on a front surface of a respective circuit board; a plurality of phase cables, each of the phase cables being mounted to two circuit boards disposed on diametrically opposed reflector panels, the phase cables being positioned forwardly of the circuit boards; and a plurality of cable mounting guides mounted on the plurality of circuit boards, each of the cable mounting guides includes a plurality of recesses. The phase cables engage the cable mounting guides in the recesses, and the cable mounting guides maintain the phase cables in a desired position.

BRIEF DESCRIPTION OF THE FIGURES

FIG. 1 is a simplified schematic diagram illustrating a conventional small cell cellular base station.

FIG. 2 is a perspective view of a cable mounting guide according to embodiments of the invention.

FIG. 2A is a perspective view of a cable mounting guide according to alternative embodiments of the invention.

DETAILED DESCRIPTION

Figure 3:
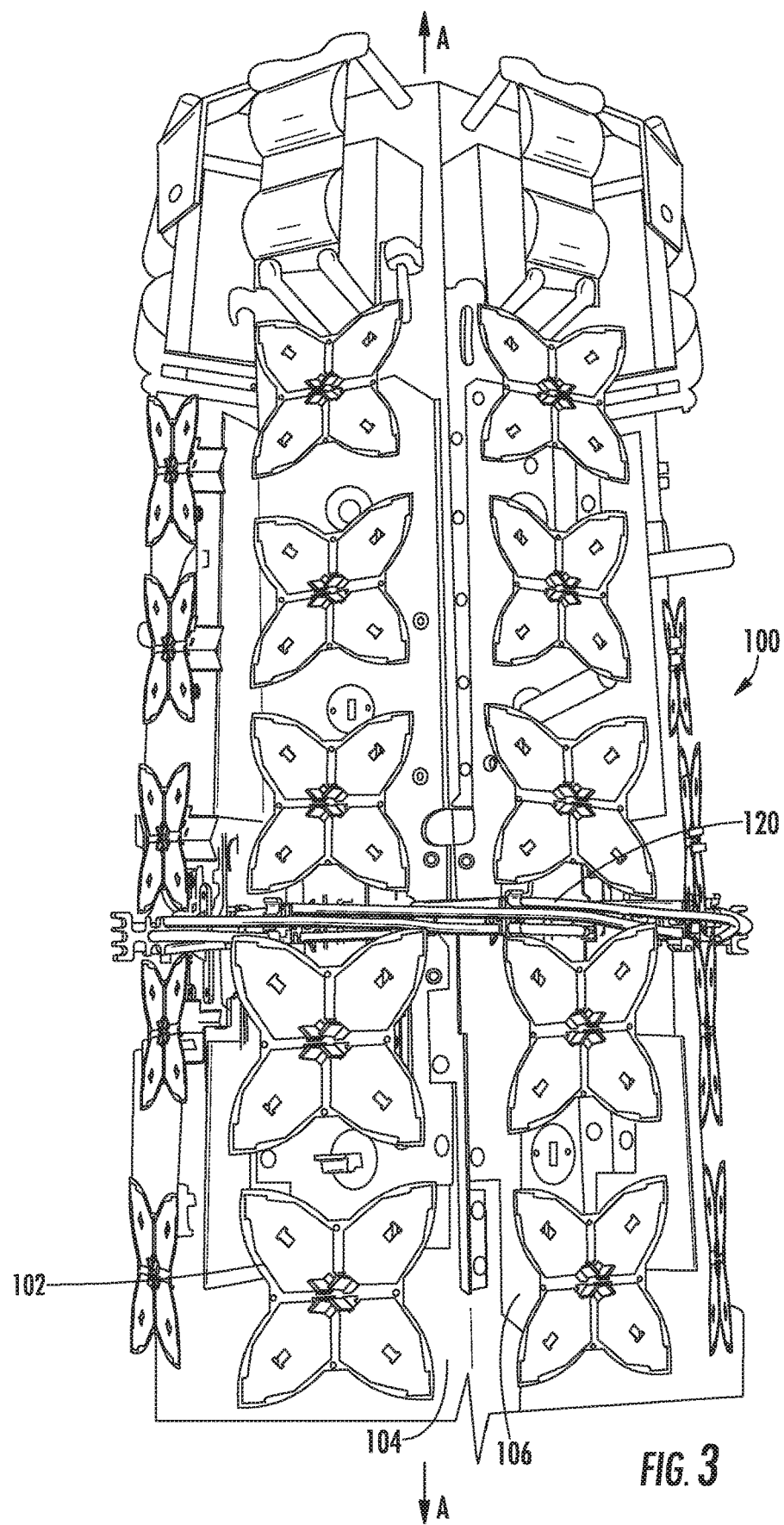
FIG. 3 is a perspective view of a small cell antenna that employs cable mounting guides of FIGS. 2 and 2A.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Referring now to the figures, a cable mounting guide, designated broadly at 10, is shown in FIG. 2. The cable mounting guide 10 includes a base panel 12 with a lateral projection 14 at one end. A hole 16 is located at one end of the base panel 12, and a hole 18 is located at the opposite end in the lateral projection 14.

A guide tower 20 extends generally normal to the base panel 12. The guide tower 20 has a main body 22 supported on the base panel 12 by two gussets 24. Two closed end receptacles 26 are located in the main body 22 above the gussets 24. Three arcuate recesses 28 are located on each side edge of the main body 22; these are separated on either side by fingers 30. At its upper end, the main body 22 includes three additional arcuate recesses 32 that are separated from each other by fingers 34. A gusset 38 supports each of the recesses 32 from underneath. Notably, the longitudinal axes of the receptacles 26, the recesses 28 and the recesses 32 are substantially parallel.

The cable mounting guide 10 may be formed of a variety of materials, including dielectric polymeric materials. Exemplary materials include acetal and acrylonitrile-butadiene-styrene polymers. If the cable mounting guide 10 is formed of a polymeric material, it may be formed via injection molding.

An alternative cable mounting guide is shown in FIG. 2A and designated broadly at 10'. The cable mounting guide 10' is similar to the cable mounting guide 10, with the exception that base panel 12' thereof has no lateral projection at one end.

Referring now to FIG. 3, a small cell antenna, designated broadly at 100, is shown therein. The small cell antenna 100 may be constructed in much the same manner discussed and illustrated in co-assigned U.S. Provisional Patent Application No. 62/593,425, filed Dec. 1, 2017. In brief, the small cell antenna 100 is generally octagonal. An underlying reflector 104 has eight panels, each disposed at an angle of about 135 degrees to its neighboring panels. A circuit board 106 is mounted on each panel of the reflector 104. A plurality of "butterfly"-shaped radiating elements 102 is then mounted on each circuit board 106. The radiating elements 102 are mounted in eight subsets as columns (one column per reflector panel) of five radiating elements 102 each. For purposes of orientation, as used herein the terms "forward", "front" and derivatives thereof refer to a direction radially outward from the longitudinal axis A of the antenna 100; conversely, the terms "rear", "back" and derivatives thereof refer to a radial direction opposite of the "forward" direction (i.e., from the reflector 104 toward the longitudinal axis A).

Figure 4:
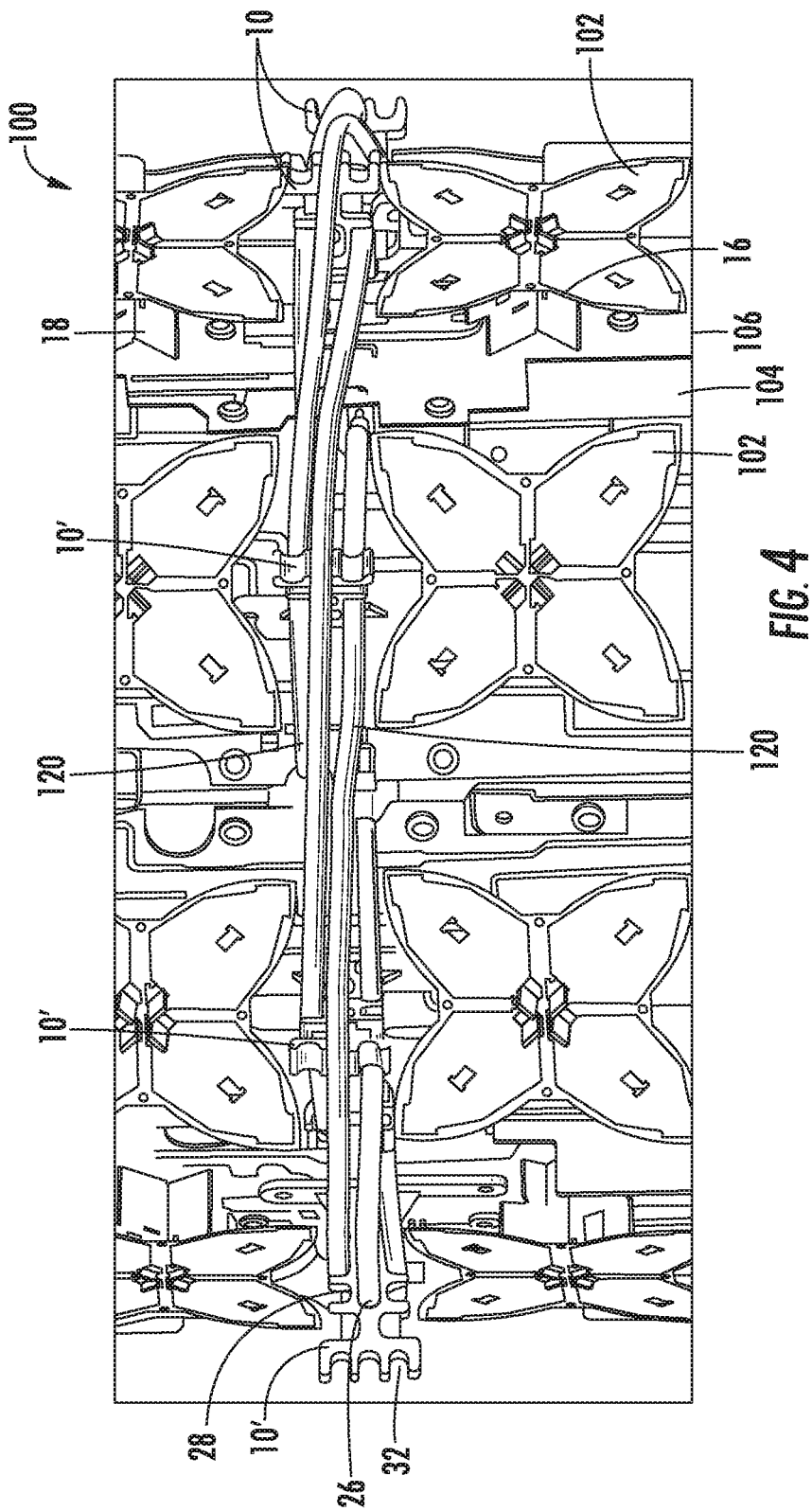
FIG. 4 is an enlarged partial perspective view of the small cell antenna of FIG. 3 showing cables mounted in the cable guides of FIGS. 2 and 2A.

A plurality of cable guides are mounted on the small cell antenna 100 between rows of radiating elements 102. As can be seen in FIG. 4, three cable mounting guides 10' and two cable guides 10 are mounted to the circuit boards 106 between radiating elements 102 in the second and third rows (as counted from the lower end of the small cell antenna 100 in FIG. 3). The cable mounting guides 10, 10' are mounted via rivets inserted through the holes 16, 18 (but may be mounted via other means in alternative embodiments) and extend forwardly from the reflector 104 and circuit boards 106 such that the recesses 28, 32 and the receptacles 26 are positioned forwardly of the circuit boards 106.

The antenna 100 includes a plurality of coaxial phase cables 120. Phase cables are included in an antenna to transmit RF signals. The phase cables 120 are secured at each end to circuit boards 106 that are diametrically opposed across the antenna 100 via soldering, welding or the like. As can be seen in FIGS. 2 and 3, the phase cables 120 are also mounted in the recesses 28, 32 of the cable mounting guides 10, 10'.

Figure 5:
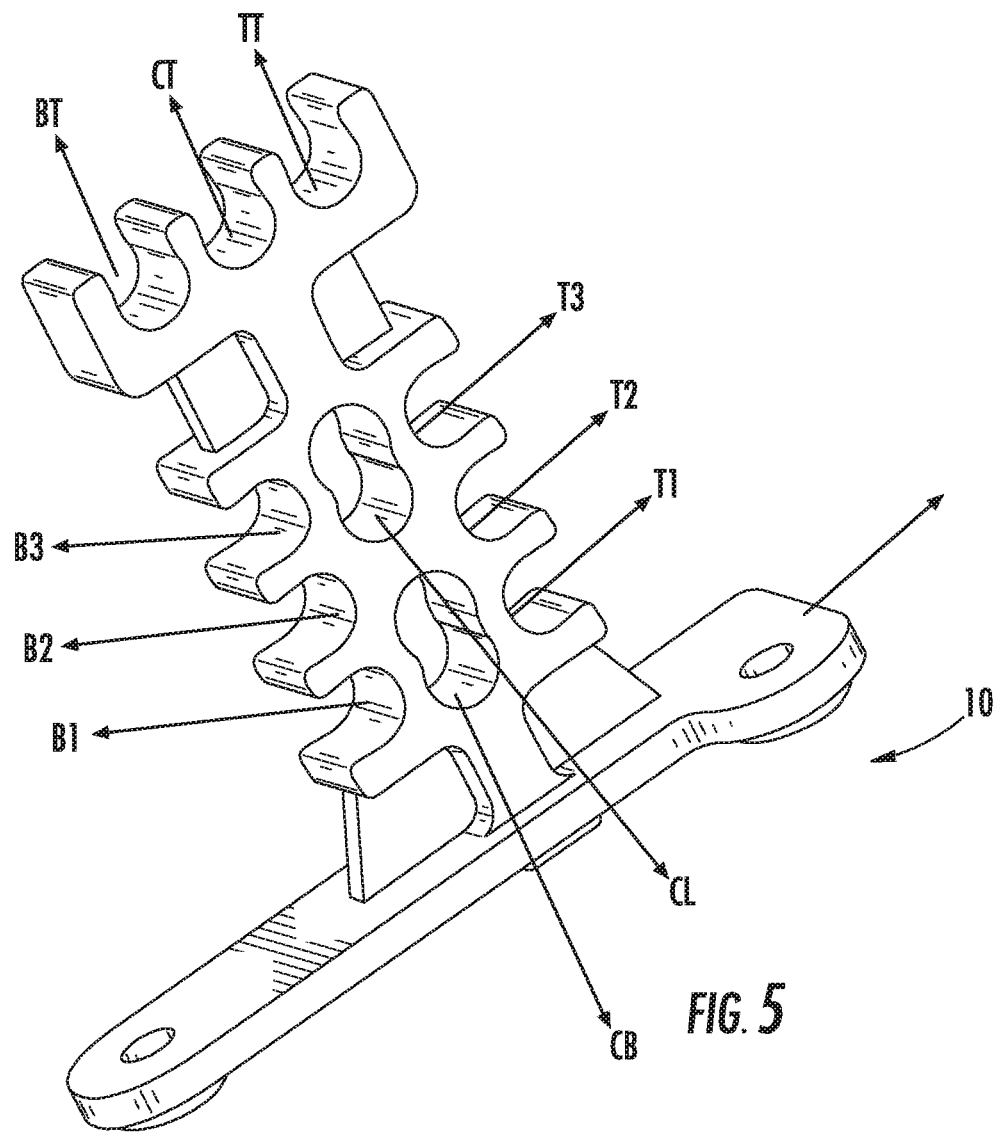
FIG. 5 is a perspective view of the cable mounting guide of FIG. 2 showing designations for the recesses and receptacles.

As can be understood by reference to FIG. 4, the phase cables 120 are routed between various of the recesses 28, 32 of multiple cable mounting guides 10, 10' (and, in some embodiments, the receptacles 26) along predetermined paths. Referring to FIG. 5, the receptacles 26 and recesses 28, 32 can be assigned descriptors as are shown therein. Also, attachment positions on the circuit boards 106 can also be assigned descriptors. Table 1 below sets out a scheme for different phase cables 120.

reflector 104 to which it is mounted) the phase cable 120 is attached to. The "L" and "R" designations indicate to which side of the circuit board 106 the phase cable is attached. The "Panel/Guide" columns indicate on which reflector panel the cable guide 10, 10' is mounted and in which receptacle 26 or recess 28, 32 each phase cable 120 mounts in for various positions around the small cell antenna 100. As an example, the phase cable 120 is routed between positions P1R and P5L (i.e., from the right side position on Panel 1 to the left side position on Panel 5), and in doing so passes through three cable guides 10, 10': it is received in recess T3 at panel 2, recess CT at panel 3, and recess B3 at panel 4. The remaining phase cables 120 are routed as shown in Table 1.

Because the phase cables 120 are mounted forwardly of the reflector 104, they are more easily assembled (particularly via soldering or welding) than if they were, as is conventional, positioned behind the reflector 104. The positions of the recesses 28, 32 and receptacles 26 of the cable mounting guides 10, 10' can facilitate precise routing of the phase cables 120. Moreover, in some embodiments, the recesses 28, 32 and receptacles 26 are sized to permit a snug fit with the phase cables 120 to prevent slippage of the phase cables 120 once they are inserted therein. As an example, for 4.5 mm phase cables, the recesses 28, 32 may have a radius of 4.6 mm.

Additionally, the phase cables 120 are positioned to be employed as parasitic isolators. Typically, metal arc is used to reduce coupling between radiating elements of an antenna. However, in the illustrated small cell antenna 100, the phase cables 120 themselves can provide this function, thereby eliminating the need for metal arc. In order to provide parasitic isolation via phase cables 120, the positions of the phase cables 120 should be relatively precise. Use of the cable mounting guides 10, 10' can ensure positioning of the phase cables 120 along a desired path that can provide the degree of specified parasitic isolation. The snug fit of the phase cables 120 within the recesses 28, 32 and receptacles 26 can prevent the phase cables 120 from shifting or slipping, thereby maintaining the phase cables 120 in the proper position to provide parasitic isolation. The variety of positions available on each cable mounting guide 10, 10' (both axially and radially) can enable the phase cables 120 to be positioned as needed. In some embodiments, sections of a phase cable 120 may be at least 10 mm, and in some instances 12 mm, forwardly of the immediately underlying circuit board 106.

Notably, the shielding from the outer conductor of the phase cables 120 is in neighborhood of −110 dB, such that

|  | Start-->End | Starting Point | Panel/Guide | Panel/Guide | Panel/Guide | End Point |
| --- | --- | --- | --- | --- | --- | --- |
| LONG(Yellow 342 mm) | P1R -->P5L | P1R | P2 T3 | P3 CT | P4 B3 | P5L |
|  | P2R-->P6L | P2R | P3 T3 | P4 CT | P5 B3 | P6L |
|  | P3R-->P7L | P3R | P4 T3 | P5 CT | P6 B3 | P7L |
|  | P4R-->P8R | P4R | P5 T3 | P6 CT | P7 B3 | P8L |
| SHORT (Green302 mm) | P1L-->P5R | P1L | P8 B2 | P7 CL | P6 T1 | P5R |
|  | P2L-->P6R | P2L | P1 B2 | P8 CL | P7 T1 | P6R |
|  | P3L-->P7R | P3L | P2 B2 | P1 CL | P8 T1 | P7R |
|  | P4L-->P8R | P4L | P3 B2 | P2 CL | P1 T1 | P8R |

Table 1 can be interpreted as follows. The columns labeled "StartEnd", "Starting Point" and "End Point" represent the starting and ending points of each phase cable 120, with "P1L"-"P8L" and "P1R"-"P8R" designating a position on one of the circuit boards 106 (which are numbered sequentially) mounted on the reflector 104. "P1-P8" denote which circuit board 106 (based on the panel of the the RF signal transmitted through the cable should not negatively impact neighboring radiating elements 102.

It should also be noted that the snug fit of the phase cables 120 within the recesses 28, 32 and the receptacles 26 can also allow the cable mounting guides 10, 10' to serve as strain relief points, thereby protecting the soldered or welded joints of the phase cables 120 with the reflector 104.

Those of skill in this art will appreciate that the cable mounting guides 10, 10' may take other forms. For example, they may have more or fewer recesses 28, 32 and/or receptacles 26. The main body 22 may be taller, shorter, wider, or narrower as desired. The cable mounting guides 10, 10' may be formed of different materials. Other variations that engage phase cables 120 and maintain their position may be apparent to those of skill in this art.

It should also be understood that the small cell antenna 100 shown herein may take other configurations, as it may have more or fewer "columns" of radiating elements 102, such that the antenna has a different regular polygonal profile, such as hexagonal or square. Also, the small cell antenna 100 may have different numbers of "rows" of radiating elements 102. Further, the small cell antenna 100 may have radiating elements 102 of a different configuration.

In addition, the phase cables 120 may be more or less numerous, and/or may be positioned in different locations or follow different paths as desired.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A communications antenna, comprising:
   an elongate reflector comprising a plurality of panels that define a regular polygonal profile, the reflector having a longitudinal axis;
   a plurality of circuit boards, each of the circuit boards mounted to a respective reflector panel;
   a plurality of subsets of radiating elements, each subset of radiating elements mounted in a column on a front surface of a respective circuit board; and
   a plurality of phase cables, each of the phase cables being mounted to two circuit boards disposed on diametrically opposed reflector panels, the phase cables being positioned forwardly of the circuit boards.

2. The communications antenna defined in claim 1, further comprising a plurality of cable mounting guides mounted on the plurality of circuit boards, the cable mounting guides configured to engage one or more phase cables and maintain the phase cables in a desired position.

3. The communications antenna defined in claim 2, wherein each of the cable mounting guides includes a plurality of recesses, and wherein the phase cables engage the cable mounting guides in the recesses.

4. The communications antenna defined in claim 3, wherein each of the cable mounting guides includes a main body, with a top edge and opposed side edges, and wherein the recesses are located on the top edge and the side edges.

5. The communications antenna defined in claim 1, wherein a section of each of the phase cables is positioned at least 10 mm forwardly of an immediately underlying circuit board.

6. The communications antenna defined in claim 2, wherein the cable mounting guides are formed of a polymeric material.

7. The communications antenna defined in claim 1, wherein the plurality of reflector panels is eight reflector panels.

8. The communications antenna defined in claim 1, wherein the phase cables are mounted to the circuit boards via soldering.

9. The communications antenna defined in claim 3, wherein the recesses and the phase cables are configured such that the phase cables interference fit in the recesses, such that the cable mounting guides serve as strain relief for the cables.

10. A cable mounting guide, comprising:
    a base panel;
    a main body extending normal to the base panel;
    wherein the main body has a top edge and opposed side edges, and wherein each of the top edge and the side edges includes a plurality of recesses; and
    wherein the cable mounting guide is formed of a polymeric material.

11. The cable mounting guide defined in claim 10, wherein the main body further includes a plurality of closed-end receptacles.

12. A communications antenna, comprising:
    an elongate reflector comprising a plurality of panels that define a regular polygonal profile, the reflector having a longitudinal axis;
    a plurality of circuit boards, each of the circuit boards mounted to a respective reflector panel;
    a plurality of subsets of radiating elements, each subset of radiating elements mounted in a column on a front surface of a respective circuit board;
    a plurality of phase cables, each of the phase cables being mounted to two circuit boards disposed on diametrically opposed reflector panels, the phase cables being positioned forwardly of the circuit boards; and
    a plurality of cable mounting guides mounted on the plurality of circuit boards, each of the cable mounting guides includes a plurality of recesses, and wherein the phase cables engage the cable mounting guides in the recesses, the cable mounting guides maintaining the phase cables in a desired position.

13. The communications antenna defined in claim 12, wherein each of the cable mounting guides includes a main body, with a top edge and opposed side edges, and wherein the recesses are located on the top edge and the side edges.

14. The communications antenna defined in claim 12, wherein a section of the phase cable is positioned at least 10 mm forwardly of an immediately underlying circuit board.

15. The communications antenna defined in claim 12, wherein the cables guides are formed of a polymeric material.

16. The communications antenna defined in claim 12, wherein the plurality of reflector panels is eight reflector panels.

17. The communications antenna defined in claim 12, wherein the phase cables are mounted to the circuit boards via soldering.

18. The communications antenna defined in claim 12, wherein the recesses and the phase cables are configured such that the phase cables interference fit in the recesses, such that the cable mounting guides serve as strain relief for the phase cables.

* * * * *